United States Patent
Clouser

(10) Patent No.: US 9,284,968 B2
(45) Date of Patent: Mar. 15, 2016

(54) MOUNTING CLAMP FOR POLE

(71) Applicant: Doug Clouser, Galloway, OH (US)

(72) Inventor: Doug Clouser, Galloway, OH (US)

(73) Assignee: Gary L. Sharpe, Naples, FL (US)

( * ) Notice: Subject to any disclaimer, the term of this patent is extended or adjusted under 35 U.S.C. 154(b) by 367 days.

(21) Appl. No.: 13/719,997

(22) Filed: Dec. 19, 2012

(65) Prior Publication Data

US 2013/0206938 A1    Aug. 15, 2013

Related U.S. Application Data

(60) Provisional application No. 61/577,337, filed on Dec. 19, 2011.

(51) Int. Cl.

| F16B 2/14 | (2006.01) |
|---|---|
| F16M 13/02 | (2006.01) |
| F16B 2/10 | (2006.01) |
| F16B 3/06 | (2006.01) |
| A47B 57/54 | (2006.01) |
| A47B 57/56 | (2006.01) |
| A47F 5/08 | (2006.01) |
| F16B 7/14 | (2006.01) |
| F16B 3/00 | (2006.01) |
| F16L 3/10 | (2006.01) |
| F16B 2/12 | (2006.01) |

(52) U.S. Cl.
CPC . *F16B 2/14* (2013.01); *A47B 57/54* (2013.01); *A47B 57/567* (2013.01); *A47F 5/0838* (2013.01); *F16B 2/10* (2013.01); *F16B 3/00* (2013.01); *F16B 3/06* (2013.01); *F16B 7/149* (2013.01); *F16L 3/10* (2013.01); *F16L 3/105* (2013.01); *F16L 3/1091* (2013.01); *F16M 13/022* (2013.01); *F16B 2/12* (2013.01)

(58) Field of Classification Search
CPC ................ F16B 2/14; F16B 2/10; F16B 3/06; F16B 2/12; F16B 7/149; F16B 3/00; F16M 13/022; A47B 57/54; A47B 57/567; A47F 5/0838; F16L 3/10; F16L 3/105; F16L 3/1091
USPC ............... 248/223.41, 227.3, 229.11, 229.12, 248/229.14, 229.22, 229.24, 230.1, 230.2, 248/230.3, 230.5, 231.21, 231.31, 231.41, 248/231.61, 245, 297.21, 297.51; 254/104
See application file for complete search history.

(56) References Cited

U.S. PATENT DOCUMENTS

| 964,975 | A | * | 7/1910 | Kirby | 248/244 |
|---|---|---|---|---|---|
| 1,182,610 | A | * | 5/1916 | Wiesman | 403/318 |
| 1,563,518 | A | * | 12/1925 | Northey | 411/355 |
| 2,546,792 | A | * | 3/1951 | Smith | F16L 3/24 248/56 |
| 2,625,354 | A | * | 1/1953 | Smith | B60T 17/046 248/56 |

(Continued)

FOREIGN PATENT DOCUMENTS

| AU | WO 2005088181 A1 * | 9/2005 | ............. F16L 3/085 |
|---|---|---|---|
| DE | 3843540 A1 * | 8/1989 | |

(Continued)

*Primary Examiner* — Terrell McKinnon
*Assistant Examiner* — Eret McNichols
(74) *Attorney, Agent, or Firm* — Standley Law Group LLP

(57) ABSTRACT

A device for mounting objects to a pole is disclosed. The device includes a first part having a channel therein and keys extending therefrom. A second piece also having a channel therein has keyways adapted to slidably receive the keys on the first part. The first and second parts are joined together to suspend objects from a pole.

12 Claims, 5 Drawing Sheets

(56) References Cited

U.S. PATENT DOCUMENTS

| | | | | |
|---|---|---|---|---|
| 2,661,919 | A | * | 12/1953 | Johnson ............... F16L 5/00 248/56 |
| 2,872,144 | A | * | 2/1959 | Hobson ................... 248/223.41 |
| 3,069,189 | A | * | 12/1962 | Hollaender ............. E04G 7/14 285/188 |
| 3,861,816 | A | * | 1/1975 | Zaidan ........................ 403/385 |
| 4,140,414 | A | * | 2/1979 | Buttgereit ..................... 403/71 |
| 4,222,538 | A | * | 9/1980 | Jensen ............... B60T 17/046 248/56 |
| 4,258,892 | A | * | 3/1981 | Craine ..................... 248/220.41 |
| 4,799,818 | A | * | 1/1989 | Sudimak et al. ............. 403/107 |
| 4,953,819 | A | * | 9/1990 | Davis ......................... 248/227.3 |
| 5,395,079 | A | * | 3/1995 | Jensen ................... F16L 3/10 248/62 |
| 5,435,506 | A | * | 7/1995 | Wiley ...................... F16L 3/10 248/74.1 |
| 5,605,309 | A | * | 2/1997 | Nadherny ............... F16L 3/10 248/62 |
| 5,624,089 | A | * | 4/1997 | Nadherny ........... B60T 17/046 248/62 |
| 5,743,498 | A | * | 4/1998 | Kampf .................... F16L 3/24 248/62 |
| 5,941,485 | A | * | 8/1999 | Davidson et al. .......... 248/218.4 |
| 6,098,552 | A | * | 8/2000 | Gunderson ................... 108/108 |
| 7,066,298 | B1 | * | 6/2006 | Mackinnon ..................... 182/92 |
| 7,210,657 | B2 | * | 5/2007 | Plate et al. ........................ 248/72 |
| 7,261,263 | B2 | * | 8/2007 | Baker et al. ................. 248/218.4 |
| 7,490,801 | B2 | * | 2/2009 | Plate et al. ................. 248/228.1 |
| 8,371,544 | B2 | * | 2/2013 | Heitmeyer ............... F16L 3/10 248/229.1 |
| 2002/0104939 | A1 | * | 8/2002 | Perrault et al. ............. 248/218.4 |
| 2003/0110604 | A1 | * | 6/2003 | Kennard .......................... 24/569 |
| 2009/0152419 | A1 | * | 6/2009 | Wallace ...................... 248/219.4 |
| 2010/0193651 | A1 | * | 8/2010 | Railsback et al. ........ 248/229.24 |
| 2011/0198548 | A1 | * | 8/2011 | Walker, Jr. ...................... 256/10 |
| 2012/0039686 | A1 | * | 2/2012 | Miller et al. ..................... 411/355 |
| 2012/0305610 | A1 | * | 12/2012 | Womble .......................... 223/85 |
| 2013/0126687 | A1 | * | 5/2013 | Kucera ........................ 248/218.4 |
| 2013/0135848 | A1 | * | 5/2013 | Chrysanthous ............... 362/191 |
| 2014/0084012 | A1 | * | 3/2014 | LeAnna ................... 220/592.16 |
| 2014/0131408 | A1 | * | 5/2014 | Brittain et al. ................. 224/570 |
| 2015/0060621 | A1 | * | 3/2015 | Sabounjian ................... 248/243 |

FOREIGN PATENT DOCUMENTS

| | | | |
|---|---|---|---|
| EP | 0240054 | A1 * | 10/1987 |
| EP | 0252443 | A1 * | 1/1988 |
| FR | 770507 | A * | 9/1934 |
| FR | 2391676 | A2 * | 12/1978 |
| GB | 1280979 | A * | 7/1972 |

* cited by examiner

MOUNTING CLAMP FOR POLE

CROSS-REFERENCE TO RELATED APPLICATIONS

This application is a non-provisional of U.S. provisional application 61/577,337, filed Dec. 19, 2011, from which it claims priority, and which is incorporated by reference as if fully recited herein.

TECHNICAL FIELD

The disclosed embodiments relate generally to a device for attaching a weight-bearing load to a pole. More particularly, the disclosed embodiments relate to a device that uses the weight of the load to slidingly engage a first part of the device to a second part of the device, the engagement of the parts resulting in radial force on the pole and securing the load along the length of the pole.

BACKGROUND OF THE ART

In the medical field, and especially in emergency, trauma and surgical practice, the mounting pole is a ubiquitous accessory. A particular application is the use of the pole for hanging a bag of intravenous fluid.

In critical care medicine, it is vital that mechanical devices be designed for repetitive, obvious use in different circumstances to provide a reliable result. Time and attention must be focused on the patient, and not the equipment. To this extent, it is especially desirable for the device to be grabbed and used, based entirely upon the tactile sense, that is, without having to look at it. The mechanical devices must also be lightweight, portable and easily cleaned and, if necessary sterilized. Further, in some situations, the mechanical device should be devoid of metallic content, due to the devices with which it is used.

It is therefore an advantage of the embodiments disclosed herein to provide a device for attaching an item along a length of a vertical pole, using the weight of the item to hold the attaching device in place.

SUMMARY

These advantages are provided by a pole clamp as described and claimed herein. The inventive pole clamp provides an easy method of attaching weighted objects to a pole, such as baskets, cord holders, and other equipment typically found in a hospital setting. The inventive pole clamp is made of two pieces and slidably fit together applying pressure to the pole to which it is attached.

The first piece of the inventive pole clamp has a channel therein defined by the interior face of the piece and angled, ramp pieces extending therefrom. The channel can be sized to fit a variety of pole sizes and shapes. The ramp pieces have a truncated triangular shape and a key located thereon. The key is a raised portion running substantially the height of the ramp piece at an angle parallel to the hypotenuse of the ramp piece. A handle may be placed on the exterior of the first piece to facilitate application and removal of the pole clamp.

The second piece also has a channel therein defined by three sides, including an interior surface and opposing, parallel sides extending from the interior surface. The channel is sized to receive the ramp pieces of the first part such that there is intimate contact between the exterior of the ramp pieces and the interior of the side pieces of the second part. Keyways are provided in each of the side pieces and slidably receive the keys found in the ramp pieces.

The angle of the keys and keyways is such that as the pieces are slid together, the distance between the interior face of the first part and the interior surface of the second part is decreased so as to be secured to a pole. To remove the inventive pole clamp the first and second part are slid in the reverse manner then the application.

BRIEF DESCRIPTION OF THE DRAWINGS

The advantages and other characteristics of the disclosed embodiment will better understood when attention is directed to the accompanying drawings, wherein identical elements are identified with identical reference numerals, and wherein.

DETAILED DESCRIPTION OF A PREFERRED EMBODIMENT

Figure 1:
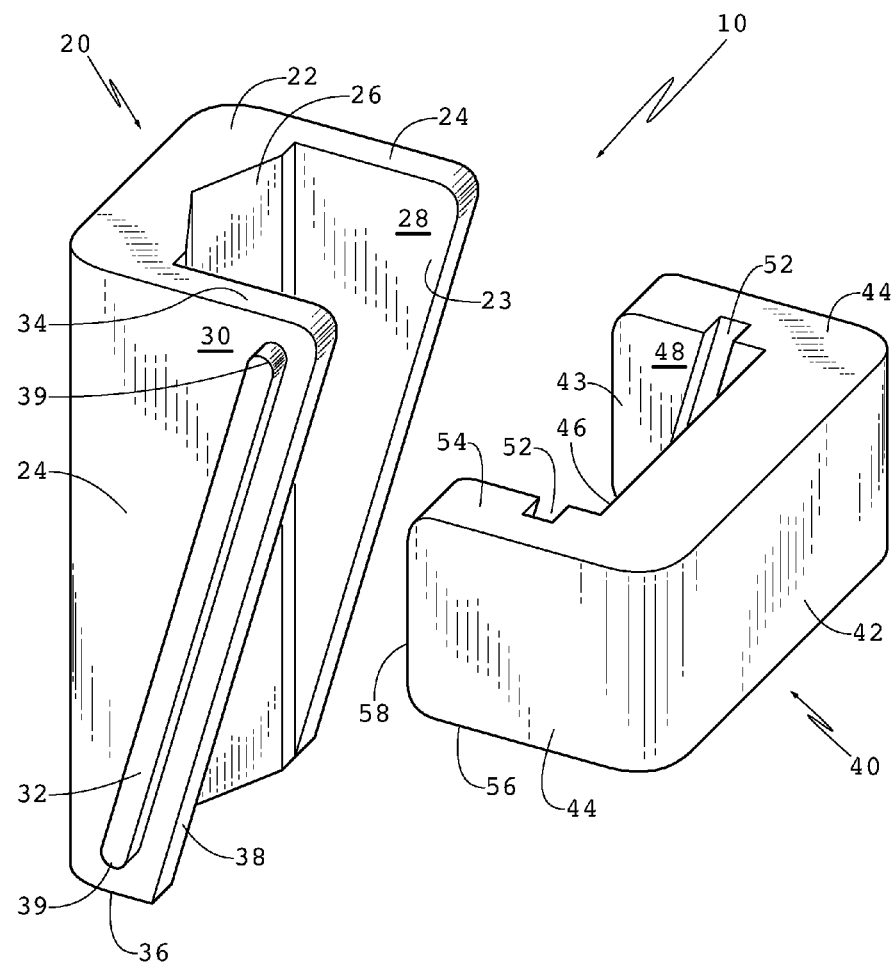
FIG. 1 is a perspective view showing the two parts of a first embodiment of a mounting clamp, in an unassembled condition.

FIG. 1 shows an embodiment of a two-part clamp 10 that provides the advantageous features. In this embodiment, the clamp 10 comprises a first part or base piece 20 and a second part or closure piece 40.

Directing attention to the base 20, it is observed to be an open channel formed from an elongate, generally rectangular, solid 22 with a pair of ramp pieces 24 extending perpendicularly from the side edges thereof. It is this parallel positioning of the ramp pieces 24 that provides the open channel shape to the base 20. Inside the channel 23, a face of the solid 22 provides a V-shaped groove 26 that runs parallel to the ramp pieces 24. In the depicted embodiment, the inside faces 28 of the ramp pieces 24 are flat and parallel, so they will not normally be involved in holding the base 20 in place against a pole (not shown in FIG. 1) and the internal angle of the groove 26 will be an obtuse angle. The function of centering and holding the pole in this instance devolves to the groove 26. In a variation of the base 20, the internal angle of the groove 26 is much closer to being a right angle (or is a right angle), in which case the groove will extend along the inside faces 28, to the point that the groove actually becomes the inside faces 28.

The outside faces 30 of the ramp pieces 24 are each provided with means for engaging the closure piece 40. In the depicted embodiment, the means for engaging is a key 32 extending outwardly from each outside face 30. Even more particularly, the keys 32 on the respective ramp pieces 24 are symmetrically positioned, although this symmetrical positioning is not necessary and, in some instances, a non-symmetrical placement of the keys may provide a quick tactile means for assuring that the two pieces 20, 40 are correctly aligned to be engaged about a pole. Further, the ramp pieces 24 are shaped as truncated right triangular solids, with a top edge 34 being longer than a bottom edge 36 and a front edge 38 that is the hypotenuse of the right triangle. In the symmetrical depiction, key 32 runs parallel to the front edge 38, with rounded ends 39 to facilitate engagement with the closure piece 40.

In a typical embodiment, a distance between inside faces 28 along the front edge 38, that is, at the widest point of separation, will typically be about 25% of a distance between top and bottom edges 34, 36. Key 32 will be positioned at an angle from the vertical in the range of about 10 to about 20 degrees, although the angle can, if anything, be larger than 20 degrees more readily than less than 10 degrees.

Directing attention now to the second part or closure piece 40, it is observed to also be an open channel formed from an elongate, generally rectangular, solid 42 with a pair of side pieces 44 extending perpendicularly from the side edges thereof. It is this parallel positioning of the side pieces 44 that provides the open channel shape to the closure piece 40. Inside the channel 43, a face of the solid 42 provides a flat surface 46 that runs parallel to the side pieces 44. In the depicted embodiment, the inside faces 48 of the side pieces 44 are flat and parallel, so they will not normally be involved in holding the closure piece 40 in place against a pole. The flat surface 46 serves to hold the pole in an almost tangential manner, instead of the more intimate contact provided by the base piece 20. The side pieces 44 may be rectangular as depicted or may be truncated right triangles as illustrates in FIGS. 3-5.

The inside faces 48 of the side pieces 44 are each provided with means for engaging the base piece 20. In the depicted embodiment, the means for engaging is a keyway 52 formed in each inside face 48. Even more particularly, the keyways 52 on the respective side pieces 44 are symmetrically positioned, although this symmetrical positioning is not necessary and, in some instances, a non-symmetrical placement of the keys may provide a quick tactile means for assuring that the two pieces 20, 40 are correctly aligned to be engaged about a pole. Further, the side pieces 44 are shaped as rectangular solids, with top and bottom edges 54, 56 of the same length and a front edge 58.

In a typical embodiment, a distance between inside faces 48 along the front edge 58 will typically be about the same as a distance between top and bottom edges 54, 56. Keyways 52 will be positioned at an angle from the vertical to match that of the keys 32 on base piece 20. While it seems to be preferred to use keys 32 on the base piece 20 and corresponding keyways 52 on the second or closure piece 40, these can be exchanged with each other and still be within the scope of providing co-acting means for engaging.

Figure 2:
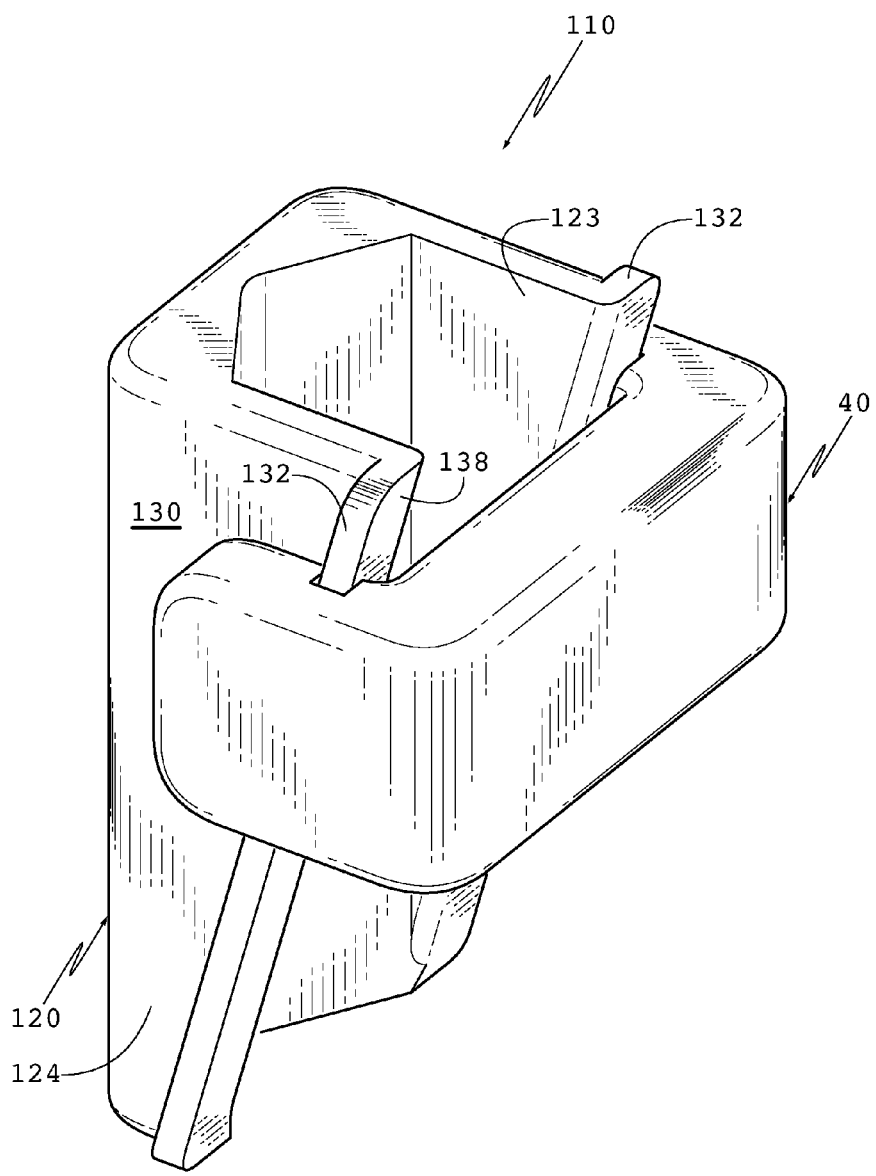
FIG. 2 is a perspective view of a second embodiment of the mounting clamp, with the two parts in an assembled condition.

FIG. 2 depicts a second embodiment 110 of a two-part clamp that provides the advantageous features. In this embodiment, the clamp 110 comprises a first part or base piece 120 and a second part or closure piece 40, with the pieces operatively engaged with each other, so that their respective channels, which are individually open, provide a closed channel 123 in which a pole is captured. In this embodiment 110, the only primary change is that the key 132 on the outside face 130 of each of the ramp pieces 124 has been moved so that it runs along edge 138.

Figure 3:
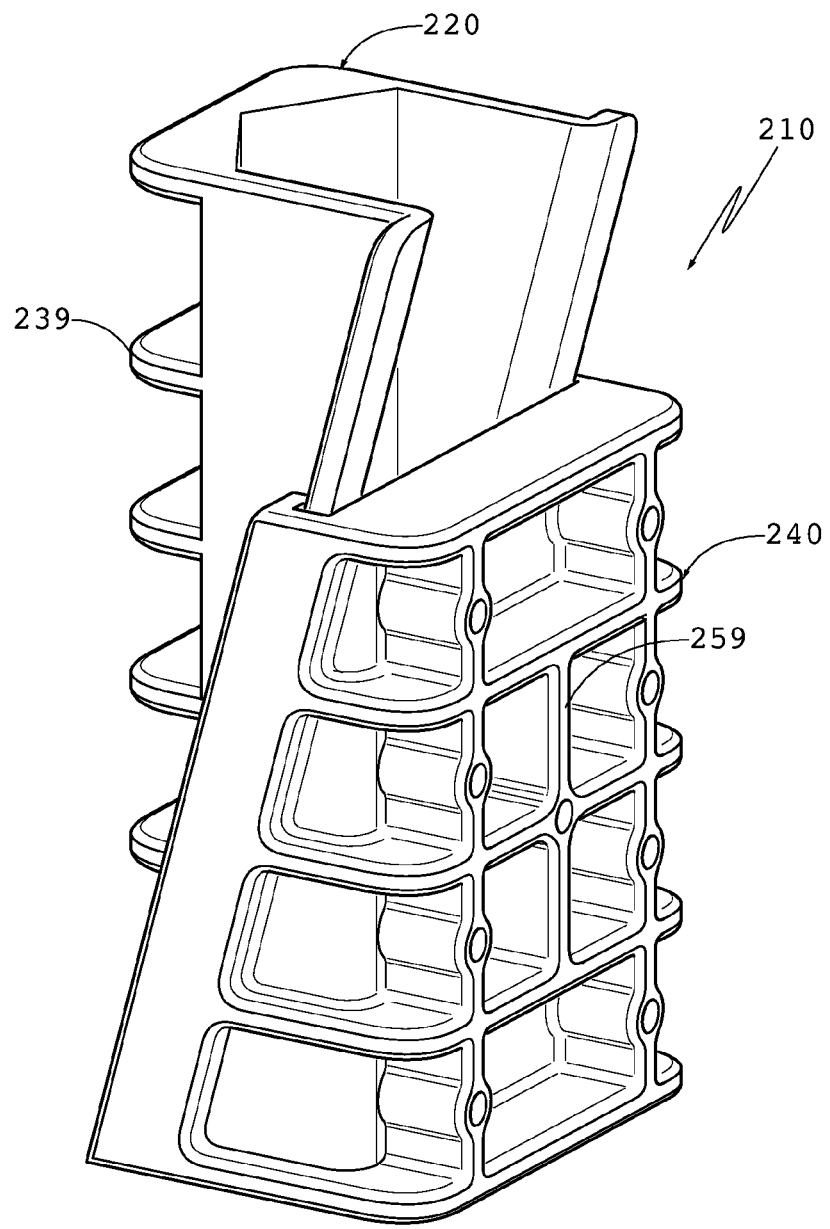
FIG. 3 is a perspective view of a third embodiment of the mounting clamp, with the two parts in an assembled condition, with the second of the two parts in the foreground.
Figure 4:
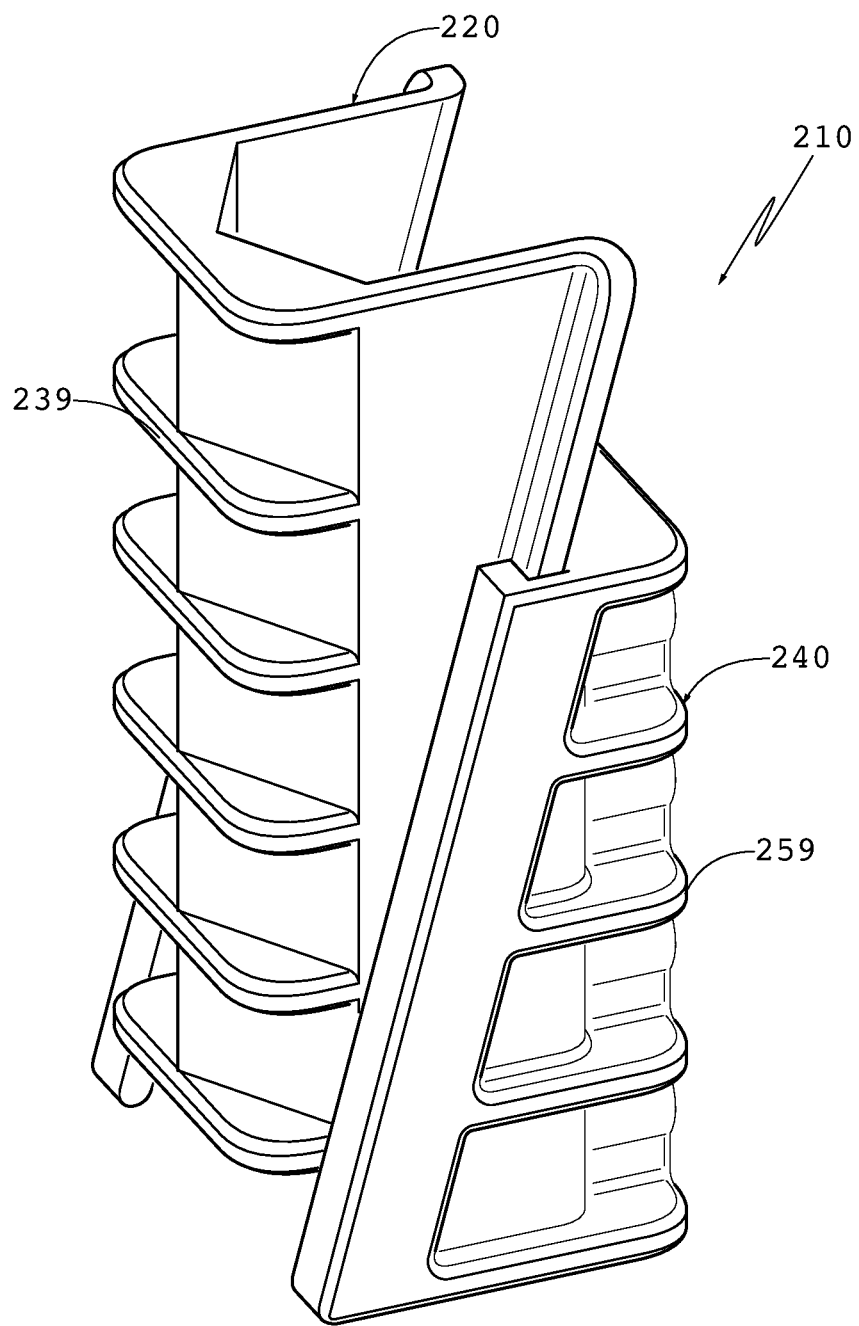
FIG. 4 is a second perspective view of the FIG. 3 embodiment, as seen from an angle with the first of the two parts in the foreground.

FIGS. 3 and 4 show a third embodiment 210 of a two-part clamp that also provides the advantageous features. In this embodiment, the clamp 210 comprises a first part or base piece 220 and a second part or closure piece 240. FIG. 3 shows the two parts 220, 240 arranged in the same manner as in FIGS. 1 and 2, that is, with closure piece 240 in the foreground, while FIG. 4 shows the two parts arranged with the base piece 220 in the foreground.

Two primary differences (as compared to embodiments 10, 110) are depicted in FIGS. 3 and 4. The first of these is that the overall bodies of the parts are not depicted as having flat walls. This is particularly apparent on an outside wall 239 of base piece 220 (best viewed in FIG. 4) and an outside wall 259 (best viewed in FIG. 3) of closure piece 240. One reason for the more open structure is favored for producing the pieces using injection molding of a thermoplastic.

The second difference that is notable in FIGS. 3 and 4 is that the height of the closure piece 240, that is, the distance between top and bottom edges 254, 256 is significantly increased as a proportion of a corresponding height in base piece 220. In the depicted embodiment 210, the heights of the two pieces are close to be the same, while other embodiments have shown the base piece 20, 120 as being substantially taller than corresponding closure piece 40, 140.

Figure 5:
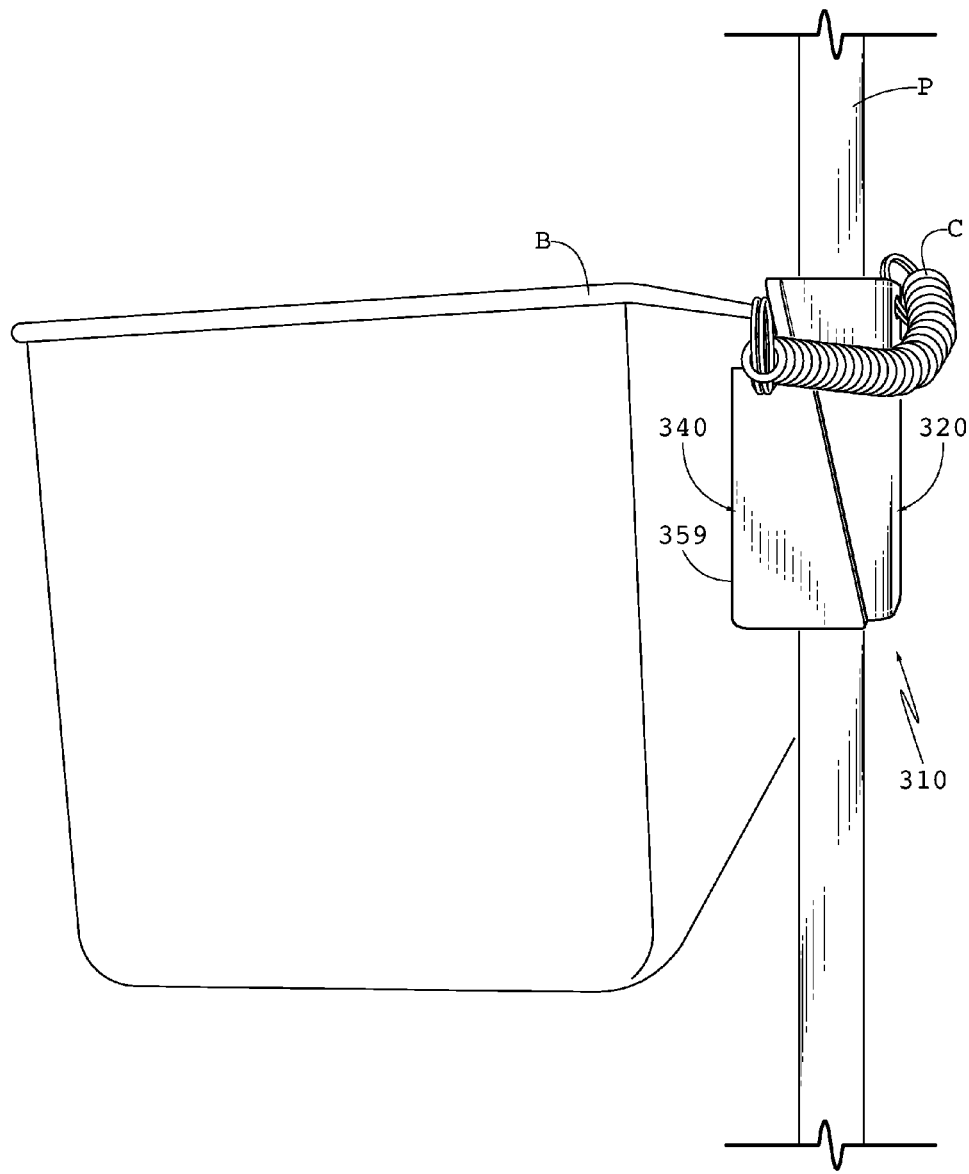
FIG. 5 is a photograph, showing a fourth embodiment of the mounting clamp, operatively holding a basket along a pole.

A yet fourth embodiment 310 of the clamp is shown in operative use with a pole P in FIG. 5. This fourth embodiment 310 has a base piece 320 and a closure piece 340 that combines the continuous flat outside walls of embodiments 10, 110 with the substantially equivalent heights of embodiment 210. This embodiment 310 also shows the closure piece 340 adapted on outside wall 359 to receive a basket B, which is exemplary of the type of use that is expected in a medical setting. It is noted that the weight of material in basket B, by pulling closure piece 340 down along the engagement means, draws the respective pieces 320, 340 together against the outside of the pole P. In some circumstances, the clamp surfaces that contact the pole will be contoured or provided with an anti-skid coating to minimize any tendency for the clamp to slide down the pole. It is also possible to affect this tendency by properly placing the point of attachment of the load from the basket (or other item being held) to influence the moment of rotation imposed by the clamp onto the pole. In this embodiment, the clamp 310 is molded from aluminum. Also, each of the pieces 320, 340 are depicted as being adapted to receive a wire or cable C that keeps the respective pieces together when not being used.

It will be evident that there are additional embodiments and applications which are not disclosed in the detailed description but which clearly fall within the scope of the appended claims. The specification is, therefore, intended not to be limiting. The present invention may be embodied in other specific forms without departing from its spirit or essential characteristics. The described embodiment is to be considered in all respects only as illustrative and not restrictive. All variations that come within the meaning and range of equivalency of the claims are to be embraced within their scope.

What is claimed is:

1. A device for clamping a load to a vertical pole, comprising:
    a first part, said first part being generally rectangular having opposing side edges and a face, including:
        ramp pieces extending perpendicularly from said side edges of said first part forming a channel with said face, wherein said ramp pieces are each truncated right triangular solids having a top edge longer than a bottom edge and front edge therebetween, thereby defining an outside face;
        a V-shaped groove in said face of said first part, said V-shaped groove running parallel to said ramp pieces;
        an anti-skid coating applied to said face of said first part; and
        a key extending outward from each ramp piece and parallel to said front edge; and
    a second part, said second part being generally rectangular having opposing side edges and a surface, including:

side pieces extending perpendicularly from said side edges of said second part forming a channel with said surface;

an anti-skid coating applied to said surface of said second part; and a keyway in each side piece adapted to slidably receive said key extending from said ramp piece.

2. The device of claim 1, wherein said side pieces are triangular.

3. The device of claim 1, wherein said keys are symmetrical.

4. The device of claim 1, wherein the key is at an angle from the vertical of about 10 to about 20 degrees.

5. The device of claim 1, wherein said first part and said second part are tethered together.

6. A device for clamping a load to a vertical pole, comprising:

a first part, said first part having a channel therein, said channel defined by truncated triangular sides and a face;

a V-shaped groove in said face of said first part;

keys extending outwardly from the triangular sides, said key running parallel to a hypotenuse of said triangular sides;

a second part, said second part having a channel therein, said channel defined by sides and a surface;

keyways arranged in an interior of the channel set within said sides, wherein said keyways are designed to slidably receive said keys extending from said triangular sides; and an anti-skid coating on said face and said surface.

7. The device of claim 6, wherein said sides of said second part are generally triangular.

8. The device of claim 6, wherein said keys are positioned at an angle from vertical in the range of about 10 to about 20 degrees.

9. The device of claim 6, wherein said second part is adapted to hold a basket.

10. The device of claim 6, wherein said first part and said second part are tethered to one another.

11. A device for clamping a load to a vertical pole, comprising:

a first part, said first part including:
   a rectangular piece having side edges and an interior face and an exterior face;
   a V-shaped groove in said interior face of said first part;
   a pair of ramp pieces extending perpendicularly from said interior face at said side edges forming a channel, said ramp pieces being truncated right triangles having an inside surface and an outside surface;
   a key extending from each outside face of the ramp pieces, said keys arranged parallel with a hypotenuse of said ramp pieces; and a second part, said second part including:
   a rectangular body having side edges and an interior surface and an exterior surface;
   a pair of side pieces extending perpendicularly from said interior surface at said side edges forming a receiving channel, said side pieces having an exterior and an interior; and
   a keyway residing along the interior of said side pieces, said side pieces spaced so as that said receiving channel slidably receives said ramp pieces of said first part therein and allows the keyways to slidably receive said keys;

a tether connecting said first part and said second part; and an anti-skid coating applied to said interior face of said first part and to said interior surface of said second part.

12. The device of claim 11, wherein said exterior surface of said second part is adapted to secure an object having weight.

* * * * *